(12) United States Patent
Ball et al.

(10) Patent No.: US 9,138,665 B2
(45) Date of Patent: Sep. 22, 2015

(54) FILTER MEDIA RETAINER ASSEMBLY

(75) Inventors: Christopher J. Ball, Cranberry Township, PA (US); Brian J. Bates, Canberry Township, PA (US); Howard James Sweeney, McDonald, PA (US)

(73) Assignee: XYLEM WATER SOLUTIONS ZELIENOPLE LLC, Zelienople, PA (US)

( * ) Notice: Subject to any disclaimer, the term of this patent is extended or adjusted under 35 U.S.C. 154(b) by 178 days.

(21) Appl. No.: 13/553,897

(22) Filed: Jul. 20, 2012

(65) Prior Publication Data

US 2014/0021121 A1    Jan. 23, 2014

(51) Int. Cl.
*B01D 24/22* (2006.01)
*B01D 24/02* (2006.01)
*B01D 24/46* (2006.01)
*B01D 24/24* (2006.01)

(52) U.S. Cl.
CPC ...................................... *B01D 24/24* (2013.01)

(58) Field of Classification Search
CPC ......... B01D 24/22; B01D 24/24; B01D 29/46
USPC ......... 210/274, 275, 291, 293, 336, 337, 356, 210/488, 489, 492, 498
See application file for complete search history.

(56) References Cited

U.S. PATENT DOCUMENTS

| 2,549,363 | A | * | 4/1951 | Blickman ..................... 210/411 |
|---|---|---|---|---|
| 3,623,978 | A | | 11/1971 | Boze et al. |
| 3,840,117 | A | | 10/1974 | Ross |
| RE28,458 | E | | 7/1975 | Ross |
| 4,082,664 | A | | 4/1978 | Lindstol |
| 4,196,079 | A | | 4/1980 | Ward |
| 4,564,450 | A | | 1/1986 | Piper et al. |
| 4,750,999 | A | | 6/1988 | Roberts et al. |
| 4,933,524 | A | | 6/1990 | Meurer |
| 5,019,259 | A | | 5/1991 | Hambley |
| 5,108,627 | A | | 4/1992 | Berkebile et al. |
| 5,116,443 | A | | 5/1992 | Meurer |
| 5,639,384 | A | | 6/1997 | Brown et al. |
| 5,976,370 | A | | 11/1999 | Medworth |
| 6,190,568 | B1 | | 2/2001 | Hunkele |
| 6,797,166 | B1 | | 9/2004 | Hambley et al. |
| 6,830,684 | B2 | | 12/2004 | Stegge |
| 6,991,726 | B2 | | 1/2006 | St. Germain |
| 7,063,787 | B2 | | 6/2006 | Jackson et al. |
| 7,090,771 | B2 | | 8/2006 | Dyson et al. |
| 7,138,056 | B2 | | 11/2006 | Hambley et al. |
| 7,192,521 | B2 | | 3/2007 | St. Germain |

(Continued)

*Primary Examiner* — Matthew O Savage
(74) *Attorney, Agent, or Firm* — The Webb Law Firm

(57) ABSTRACT

A filter system for filtering particles from a liquid includes an underdrain assembly having an underdrain defining at least one underdrain chamber and a media retainer assembly. The media retainer assembly includes an upper filter media retainer plate defining a plurality of hopper-shaped cavities and a lower filter media retainer plate defining a plurality of hopper-shaped cavities corresponding to the plurality of hopper-shaped cavities on the upper plate. The plates are in a nested arrangement such that the hopper-shaped cavities on the upper plate are in alignment with the corresponding plurality of hopper-shaped cavities on the lower plate to define a plurality of passages therebetween and allow for the passage of the liquid while preventing the passage of a filter media. During a backwash operation, the upper and lower plates are relatively moveable such that the backwash fluid releases any particles lodged in the passages between the plates.

16 Claims, 10 Drawing Sheets

(56) References Cited

U.S. PATENT DOCUMENTS

| | | |
|---|---|---|
| 7,288,193 B2 | 10/2007 | Roberts et al. |
| 7,326,351 B2 | 2/2008 | Hambley et al. |
| 7,410,578 B2 | 8/2008 | Hambley et al. |
| 7,481,930 B2 | 1/2009 | Roberts |
| 7,754,089 B2 | 7/2010 | Roberts |
| 7,897,040 B2 | 3/2011 | Newcombe et al. |
| 7,922,903 B2 | 4/2011 | Roberts et al. |
| 2005/0133434 A1 | 6/2005 | Hambley et al. |
| 2005/0194302 A1 | 9/2005 | Roberts et al. |
| 2009/0071914 A1 | 3/2009 | Roberts et al. |
| 2011/0073549 A1 | 3/2011 | Geibel et al. |
| 2011/0259804 A1* | 10/2011 | Reitzel et al. .............. 210/198.1 |

* cited by examiner

FILTER MEDIA RETAINER ASSEMBLY

BACKGROUND OF THE INVENTION

1. Field of the Invention

The present disclosure relates generally to a filter system for filtering a liquid containing particles. More particularly, the present disclosure relates to a filter system including a filter media assembly that retains filter media and prevents the buildup of biological and/or chemical scaling on the filter media assembly.

2. Description of the Related Art

Typical gravity or pressure filters use some type of filter media that captures undesirable particles, such as dirt, from a liquid being filtered as the liquid passes through the filter media to an underdrain or collection system. The filter media must be supported so that it will not pass into the underdrain or collection system.

One type of common media support utilizes one or more layers of gravel placed below the filter media to prevent the filter media from passing. Common gravel-less systems include a flat media retainer plate having either a slot sized small enough to retain the required filter media or plastic beads held together chemically or sintered together. Such systems are prone to clogging by biological or chemical scaling, which adheres to the flat media retainer plate, thus blocking or clogging the water pathways. The pressure drop across the filter assembly may continue to increase and cause a failure in the system when the head loss across the system exceeds the design pressure drop.

FIGS. 10A and 10B are representative of a common flat media retainer plate as described above. The flat media retainer plate 200 includes a top surface 202, a bottom surface 204, and defines slots or water pathways 206 therethrough. With reference to FIG. 10B, flat media retainer plate 200 is shown with biological film 208 adhered to top surface 202 of plate 200. Biological film 208 causes clogging of water pathways 206. Such clogging results a pressure drop across water pathways 206, thereby reducing the operating efficiency of the filter assembly. Biological film 208 can often clog water pathways 206 to such extent that they cannot be unclogged during a backwash procedure. In such cases, replacement of the flat media retainer plate is often necessary.

Within the prior art, U.S. Pat. No. 5,976,370 to Medworth discloses an underdrain structure for media filters. The filter media rests on a pair of perforated plates with offset perforations that are staggered between the upper and lower plates. A plurality of spacers are disposed between the upper and lower plates to maintain the distance between the plates. The plates are not relatively moveable with respect to each other during a backwashing procedure. An additional problem with the prior art media filters of the prior art is that the assembly cannot be adequately backwashed around the perimeter of the assembly where the plates are joined.

In view of the foregoing, a need exists for a filter media assembly that is less prone to clogging by the buildup of biology or chemical scaling. An additional need exists for a filter media assembly that can be easily cleaned during a backwash procedure to remove filter media that may clog the filter media assembly.

SUMMARY OF THE INVENTION

Accordingly, in view of the foregoing, a filter media assembly that overcomes the deficiencies of prior art is desired. The present disclosure provides a filter system for filtering a liquid containing particles, such as a liquid for fresh water, drinking water, or wastewater applications, which includes a media retainer assembly connected to an underdrain assembly. In accordance with one embodiment, a filter system for filtering particles from a liquid containing the particles includes an underdrain assembly having an underdrain wall defining at least one underdrain drinker and a media retainer assembly.

The media retainer assembly may include an upper filter media retainer plate defining a plurality of hopper-shaped cavities and a lower filter media retainer plate defining a plurality of hopper-shaped cavities corresponding to the plurality of hopper-shaped cavities on the upper filter media retainer plate. The plurality of hopper-shaped cavities on the upper filter media retainer plate may be in alignment with the corresponding plurality of hopper-shaped cavities on the lower filter media retainer plate to define a plurality of passages therebetween for the passage of the liquid. In one embodiment, the upper filter media retainer plate may be relatively flexible in relation to the lower filter media retainer plate. The filter system may further include a filter medium having a plurality of filter media particles disposed on the upper filter media retainer plate. The filter medium may be adapted to capture the particles from the liquid with the liquid passing through the plurality of slots to the underdrain chamber.

In another embodiment, the hopper-shaped cavities of the upper filter media retainer plate may include a first wall opposite a second wall and at least one first slot provided on at least one of the first wall or the second wall. Similarly, the hopper-shaped cavities of the lower filter media retainer may include a first wall opposite a second wall and at least one second slot provided on at least one of the first wall and the second wall. The first slots and the second slots may be together adapted to direct the flow of the fluid in the vertical direction through the media retainer assembly to the underdrain assembly. Additionally, the first slots and the second slots may prevent the passage of the filter media beyond the first slots and the second slots.

In a further embodiment, the first slots and the second slots may extend in a direction perpendicular to a longitudinal direction of the respective upper and lower filter media retainer plates. Alternatively, the first slots and the second slots may extend in a direction parallel to a longitudinal direction of the respective upper and lower filter media retainer plates. At least one support rib may extend between the first wall and the second wall of the upper and lower filter media retainer plates.

According to another embodiment, one of the first wall and the second wall of each of the upper and lower filter media retainer plates may be a sloped wall. The first or second slot may be provided on the respective sloped first wall or the second wall. The sloped walls of the upper filter media retainer plate may have a slope greater than 0 degrees but less than 90 degrees with respect to a vertical plane of the upper filter media retainer plate. Similarly, the sloped walls of the lower filter media retainer plate may have a slope greater than 0 degrees but less than 90 degrees with respect to a vertical plane of the lower filter media retainer plate.

In accordance with a further embodiment, the underdrain assembly may include a plurality of channels for providing fluid communication between the media retainer assembly and the at least one underdrain chamber. The first slots may be laterally offset from the second slots to define the plurality of passages therebetween. One or more backwash channels may be provided along at least a portion of an outside perimeter between upper and lower filter media retainer plates to clean the perimeter during a backwash procedure.

In a further embodiment, a media retainer assembly for filtering particles from a liquid containing the particles may include an upper filter media retainer plate defining a plurality of hopper-shaped cavities and a lower filter media retainer plate defining a plurality of hopper-shaped cavities corresponding to the plurality of hopper-shaped cavities on the upper filter media retainer plate. The plurality of hopper-shaped cavities on the upper filter media retainer plate may be in alignment with the corresponding plurality of hopper-shaped cavities on the lower filter media retainer plate to define a plurality of passages therebetween to allow for the passage of the liquid and to prevent the passage of a filter media. The upper filter media retainer plate may be relatively flexible in relation to the lower filter media retainer plate.

According to another embodiment, the hopper-shaped cavities of the upper filter media retainer plate may include a first wall opposite a second wall and at least one first slot provided on at least one of the first wall or the second wall. Similarly, the hopper-shaped cavities of the lower filter media retainer may include a first wall opposite a second wall and at least one second slot provided on at least one of the first wall and the second wall. The first slots and the second slots may be together adapted to direct the flow of the fluid in the vertical direction through the media retainer assembly to the underdrain assembly. Additionally, the first slots and the second slots may prevent the passage of the filter media beyond the first slots and the second slots.

In a further embodiment, the first slots and the second slots may extend in a direction perpendicular to a longitudinal direction of the respective upper and lower filter media retainer plates. Alternatively, the first slots and the second slots may extend in a direction parallel to a longitudinal direction of the respective upper and lower filter media retainer plates. At least one support rib may extend between the first wall and the second wall of the upper and lower filter media retainer plates.

In accordance with another embodiment, a media retainer assembly for filtering a liquid containing particles may include an upper filter media retainer plate defining a plurality of hopper-shaped cavities and a lower filter media retainer plate defining a plurality of hopper-shaped cavities corresponding to the plurality of hopper-shaped cavities on the upper filter media retainer plate. The upper and lower filter media retainer plates may be in a nested arrangement such that the hopper-shaped cavities on the upper filter media retainer plate are in alignment with the corresponding plurality of hopper-shaped cavities on the lower filter media retainer plate to define a plurality of passages therebetween for the passage of the liquid.

These and other features and characteristics of the filter media retainer, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
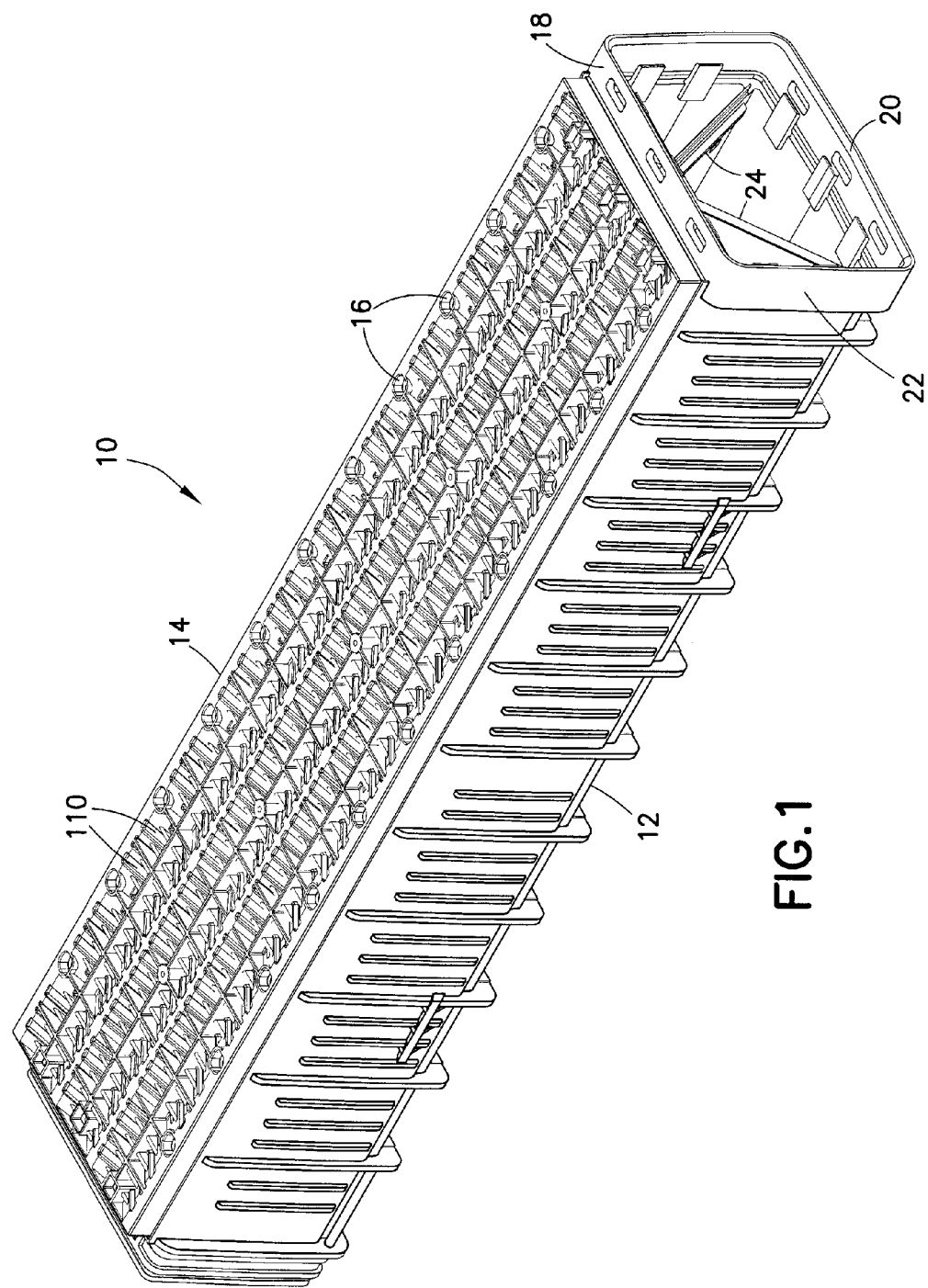
FIG. 1 is a perspective view of a filter system in accordance with an exemplary embodiment of the present disclosure.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
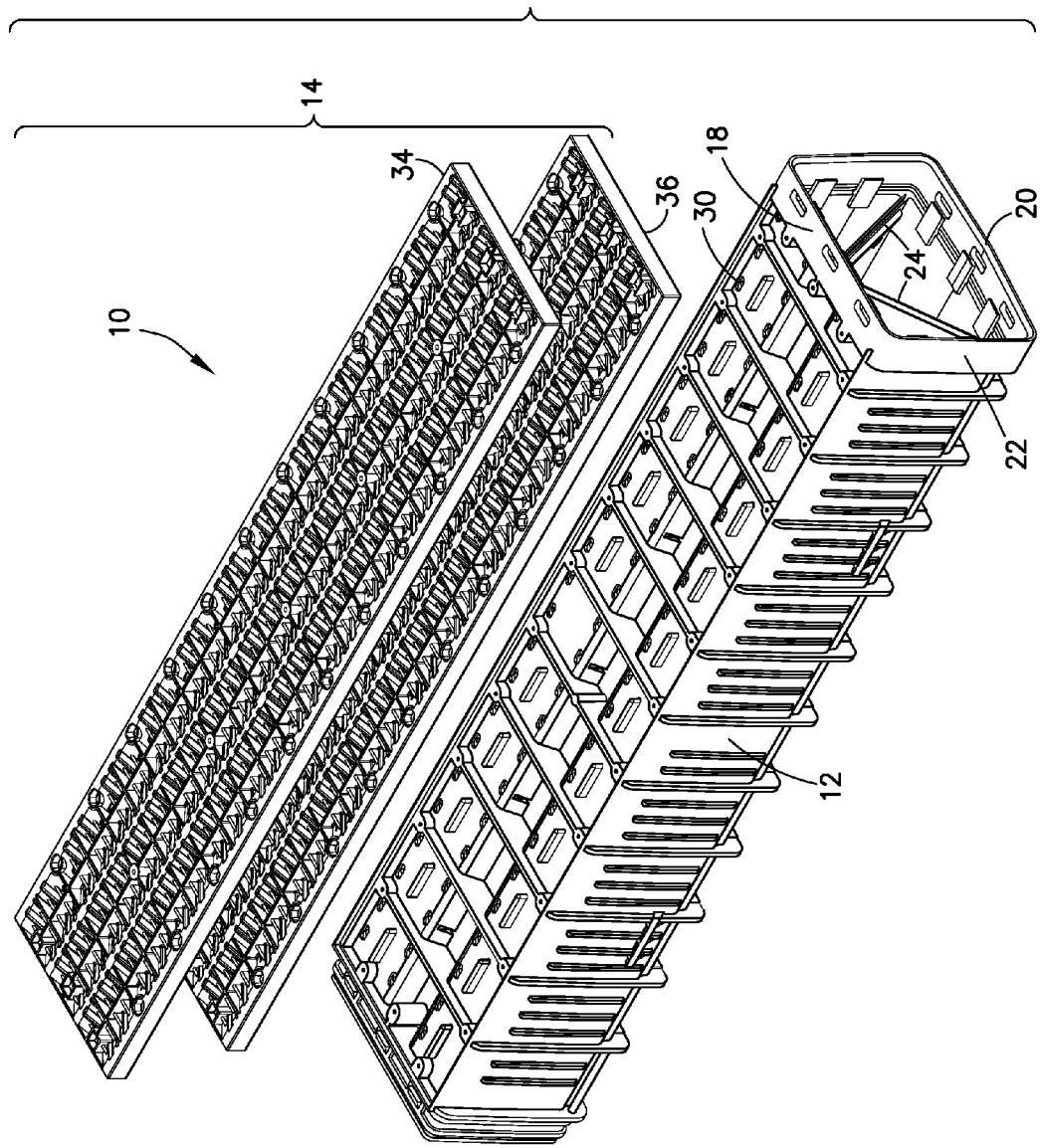
FIG. 2 is an exploded, perspective view of the filter system of FIG. 1.

Referring to FIGS. 1 and 2, gravity or pressure filter assembly or filter system 10 includes underdrain assembly or underdrain block 12, filter media retainer or media retainer assembly 14 which is adapted to be connected to underdrain assembly 12, and a plurality of fasteners 16 (FIG. 1). A layer or multiple layers of filter media (not shown) is poured on top of the filter media retainer assembly 14. In one embodiment, filter system 10 includes underdrain assembly 12 extending in a longitudinal direction and media retainer assembly 14 mounted to the top of underdrain assembly 12 by a plurality of fasteners 16 as shown in FIG. 1. Underdrain block 12 could be part of an underdrain assembly in accordance with the underdrain assembly described in U.S. Pat. No. 5,639,384, issued Jun. 17, 1997, and commonly assigned with the present application, the entire disclosure of which is hereby expressly incorporated herein by reference.

Filter media acts to remove and/or capture undesirable particles, such as dirt, debris, chemical and/or biological contaminants, from a liquid flowing through filter system 10. It is contemplated that filter media may be of any type known to be suitable by those having ordinary skill in the art, such as multiple layers of sand and gravel.

Figure 3:
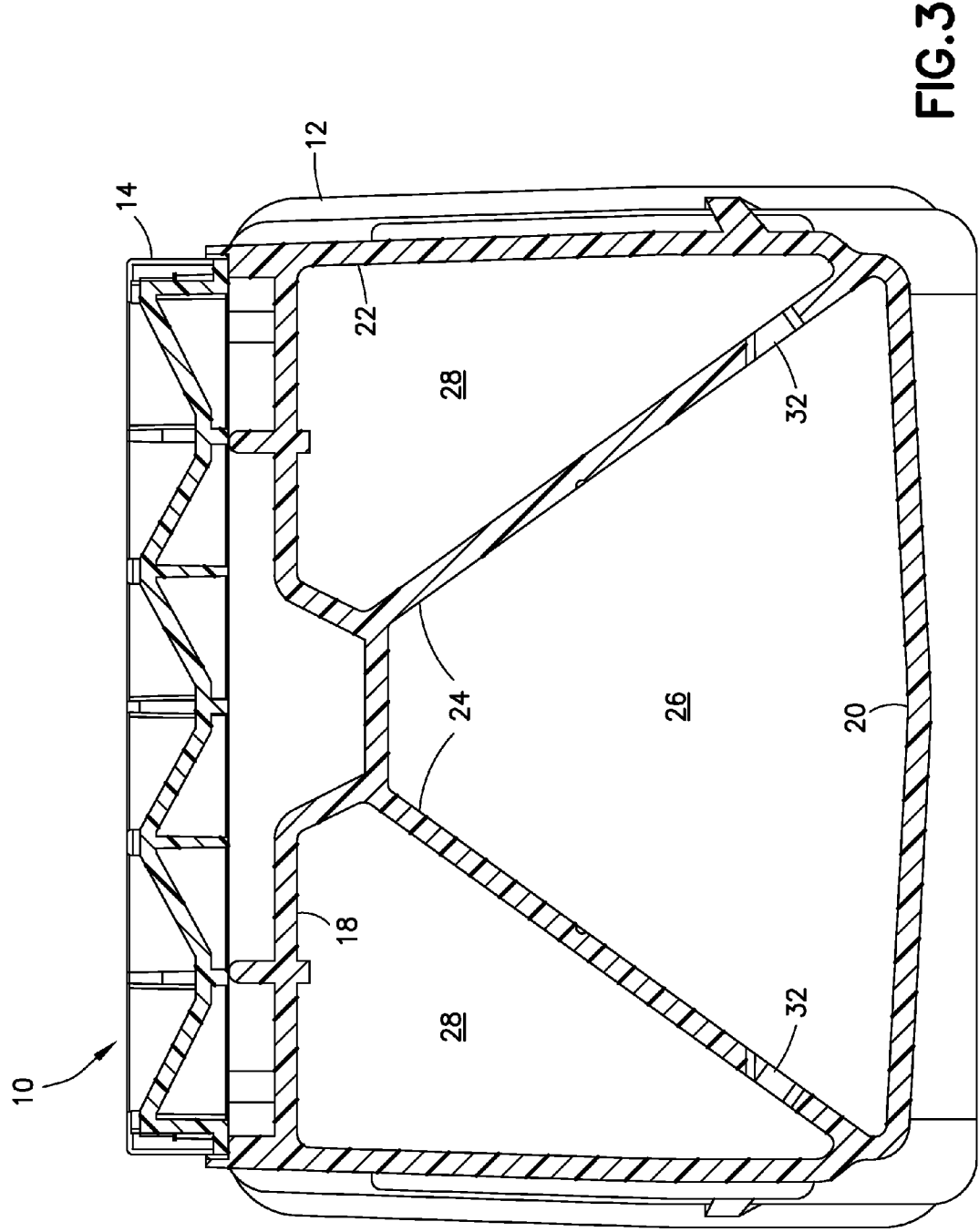
FIG. 3 is a cross-sectional view of a filter system in accordance with an exemplary embodiment of the present disclosure.

Referring to FIGS. 1-3, underdrain assembly 12 generally includes a top wall 18, a bottom wall 20, and a pair of opposed sidewalls 22 extending between top wall 18 and bottom wall 20. A plurality of internal walls 24 divide the hollow interior of underdrain assembly 12 into a primary horizontal conduit 26 and two secondary horizontal conduits 28 positioned on opposed sides of primary horizontal conduit 26. With specific reference to FIG. 3, top wall 18 of underdrain block 12 defines a plurality of dispersion apertures 30 extending in a longitudinal direction of underdrain block 12. Additionally, a plurality of channels 32 are provided on internal walls 24 to provide fluid communication between primary horizontal conduit 26 and secondary horizontal conduits 28. In a filtration mode, water to be filtered comes downward through granular media and passes through dispersion apertures. From there, water passes to secondary horizontal conduits 28 and then to primary conduit 26. Primary conduit 26 is connected to a collection flume (not shown), which in turn conveys the filtered liquid to a clearwell (not shown) for distribution to the consumer.

To ensure maximum filter performance, the granular media must be washed regularly. This is accomplished by pumping clean water back through underdrain block 12 and upward through the granular media to dislodge foreign particles from the granular media. Oftentimes, to prepare the granular media for water backwash, the submerged granular media is first scoured with an air-only backwash, wherein air is pumped upward through underdrain block 12. The air-only backwash loosens the dirt and other impurities so that they will be more easily carried off by the subsequent water backwash phase.

Referring to FIGS. 1-7B and with particular reference to FIGS. 4, 5, 6A-6B, and 7A-7B, media retainer assembly 14 includes an upper media retainer plate 34 and a lower media retainer plate 36 arranged in a nested configuration. Upper media retainer plate 34 and lower media retainer plate 36 are separately formed and are removably connectable to each other to form media retainer assembly 14. While the present disclosure is directed toward a single media retainer assembly 14 formed from a single upper media retainer plate 34 and a single lower media retainer plate 36, media retainer assembly 14 is stackable such that a plurality of media retainer assemblies 14 may be stacked vertically. In such configuration, upper and lower media retainer plates 34, 36 are alternately arranged.

Figure 6A:
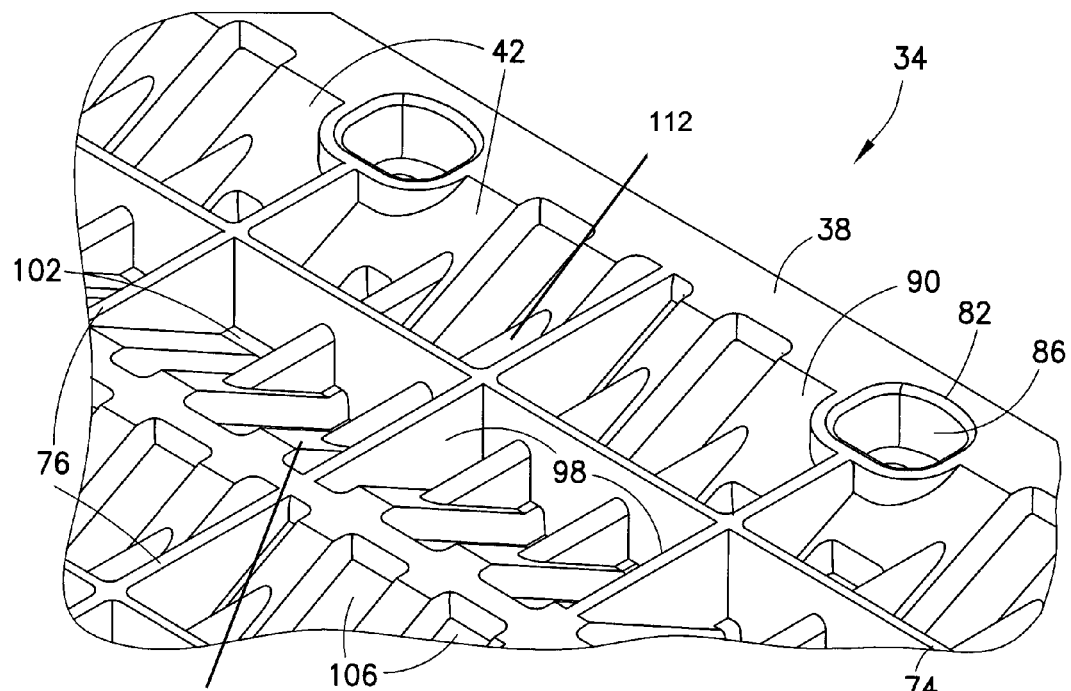
FIG. 6A is a detailed, top perspective view of a plurality of compartments of the filter media retainer assembly of FIG. 4.
Figure 6B:
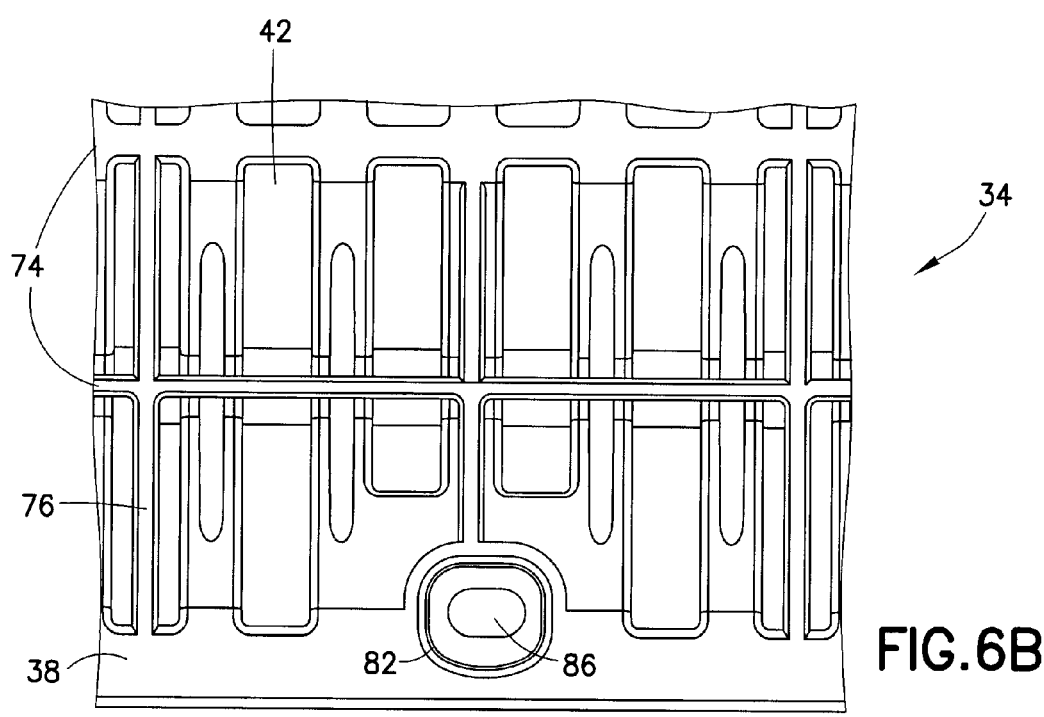
FIG. 6B is a detailed top view of a plurality of compartments of the filter media retainer assembly of FIG. 4.
Figure 7A:
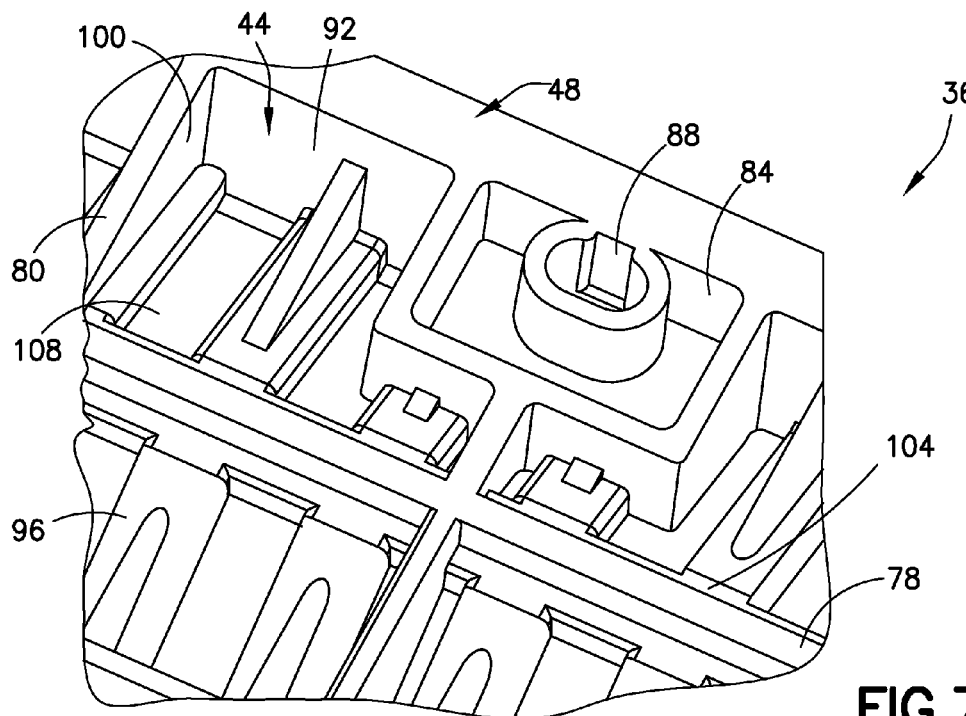
FIG. 7A is a detailed, bottom perspective view of a plurality of compartments of the filter media retainer assembly of FIG. 4.
Figure 7B:
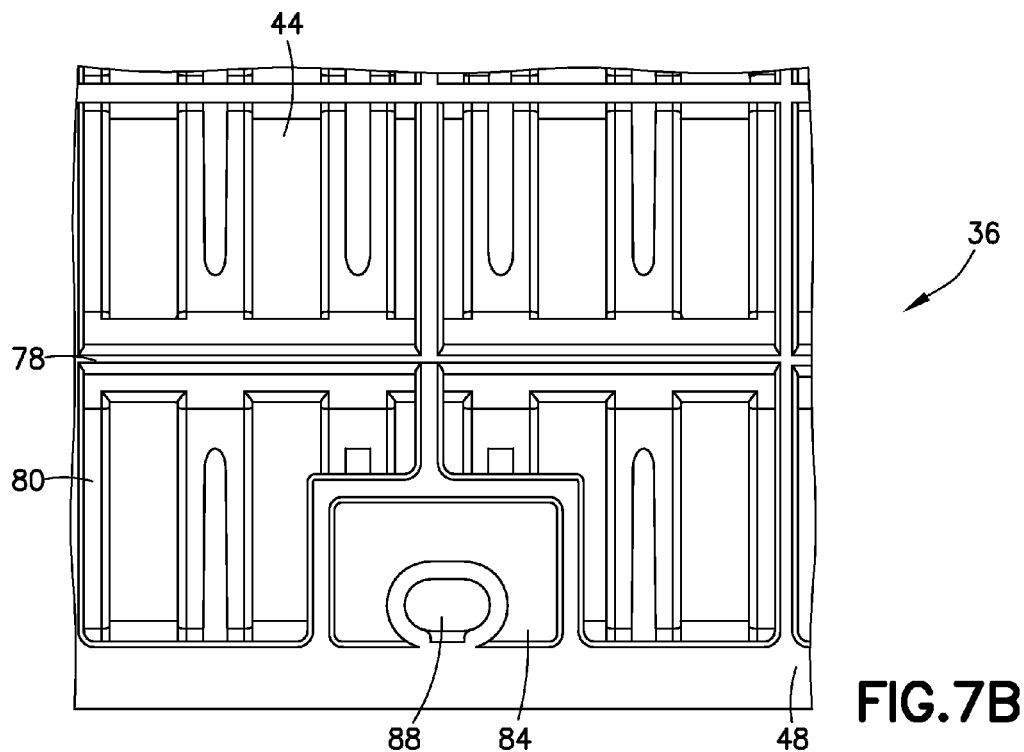
FIG. 7B is a detailed bottom view of a plurality of compartments of the filter media retainer assembly of FIG. 4.
Figure 8:
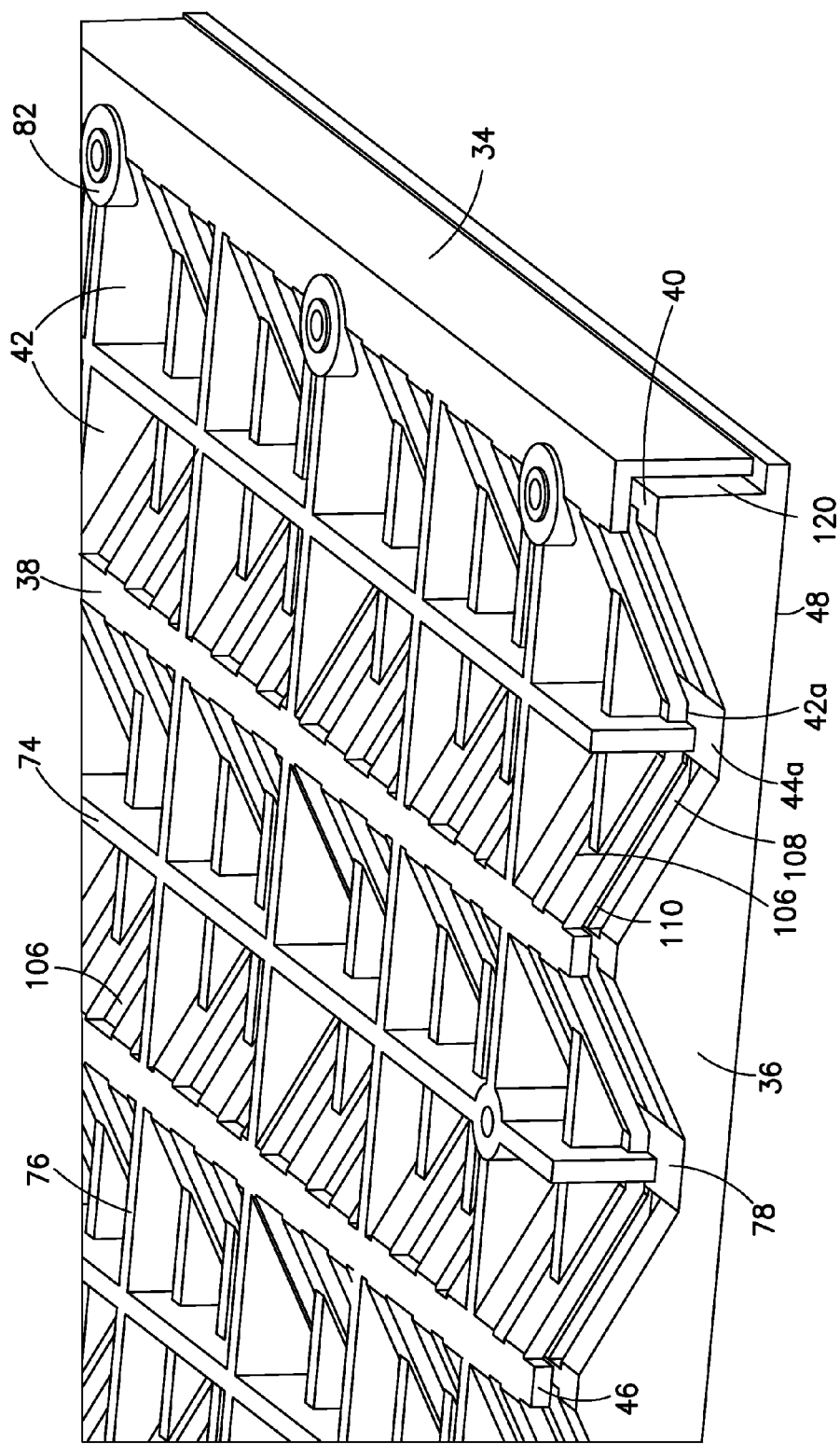
FIG. 8 is a partial cross-sectional view of another embodiment of a filter media retainer assembly having a perimeter wash feature.

With reference to FIGS. 4, 5, 6A-6B, 7A-7B, and FIG. 8 media retainer assembly 14 includes an upper filter media retainer plate 34 and a lower filter media retainer plate 36 (see FIGS. 1 and 8). Upper retainer plate 34 has a top surface 38 that defines a plurality of hopper-shaped cavities 42 (see FIGS. 6A and 8) and a bottom surface 46 with portions 42a immediately below the hopper-shaped cavities 42 that have a convex V-shaped profile (see FIG. 8). Lower retainer plate 36 has a bottom surface 48 that defines a plurality of hopper-shaped cavities 44 (see FIG. 7A) and top surface 40 with portions 44a immediately above the hopper-shaped cavities 44 having a concave V-shaped profile (see FIG. 8). As shown in FIG. 8, the portions 42a of the top retainer plate nest with portions 44a of the bottom retainer plate and the hopper-shaped cavities 42 of the top retainer plate are vertically aligned with the hopper-shaped cavities 44 of the bottom retainer plate. Upper and lower media retainer plates 34, 36 extend between a first end 50, 52 which is defined by a first end wall 54, 56 and second end 58, 60 which is defined by second end wall 62, 64. Along the perimeter of each of the upper and lower filter media retainer plates 34, 36, first sidewall or longitudinal wall 66, 68 and opposing second sidewall or longitudinal wall 70, 72 extend between first end wall 54, 56 and second end wall 62, 64. Opposing longitudinal walls 66, 68, 70, and 72 define a longitudinal direction of upper and lower media retainer plates 34, 36, i.e., longitudinal walls 66, 68, 70, and 72 run substantially parallel to a longitudinal axis of upper and lower filter media retainer plates 34, 36.

Upper filter media retainer plate 34 includes a plurality of longitudinal ribs 74 extending between first end wall 54 and second end wall 62 parallel to longitudinal sidewalls 66, 70. Upper filter media retainer plate 34 also includes a plurality of transverse ribs 76 extending between first longitudinal sidewall 66 and second longitudinal sidewall 70 parallel to end walls 54, 62. Similarly, lower filter media retainer plate 36 includes a plurality of longitudinal ribs 78 extending between first end wall 56 and second end wall 64 parallel to longitudinal sidewalls 68, 72. Additionally, lower filter media retainer plate 36 also includes a plurality of transverse ribs 80 extending between first longitudinal sidewall 68 and second longitudinal sidewall 72 parallel to end walls 56, 64.

With continuing reference to FIGS. 4, 5, 6A-6B, and 7A-7B, upper and lower filter media retainer plates 34, 36 are arranged in a nested configuration such that the plurality of hopper-shaped cavities 42 on upper filter media retainer plate 34 are in alignment with the plurality of hopper-shaped cavities 44 on lower filter media retainer plate 36. Upper and lower filter media retainer plates 34, 36 are arranged such that first and second end walls 54, 62 of upper filter media retainer plate 34 is substantially parallel with first and second end walls 56, 64 of lower filter media retainer plate 36.

Upper and lower media retainer plates 34, 36 include mounting portions 82, 84, each defining a mounting aperture 86, 88 therethrough, disposed along a periphery of upper and lower filter media retainer plates 34, 36. When assembled, mounting apertures 86 of upper filter media retainer plate 34 are in alignment with mounting apertures 88 of lower filter media retainer plate 36 such that a fastener may be inserted through mounting apertures 86, 88. In one embodiment, to connect filter media retainer assembly 14 to underdrain assembly 12, mounting apertures 86, 88 of each mounting portion 82, 84 on upper and lower filter media retainer plates 34, 36 may be aligned with respective mounting holes (not shown) on a top surface of underdrain block 12. Next, fasteners 16 may be positioned through each mounting aperture 86, 88 and secured to the mounting holes located on the top surface of underdrain block 12 to connect filter media retainer assembly 14 (i.e. upper and lower filter media retainer plates 34, 36) to underdrain assembly 12 as shown in FIGS. 1 and 3.

Upper filter media retainer plate 34 and lower filter media retainer plate 36 are joined together to form media retainer assembly 14. In one embodiment, upper and lower filter media retainer plates 34, 36 are mechanically joined to form a separable, interlocked joint. In some embodiments, upper and lower filter media retainer plates 34, 36 are desirably joined around the perimeter of each plate, i.e., the plates are joined along the respective first and second end walls (54, 56, 62, 64) and first and second sidewalls (66, 68, 70, 72). For example, upper and lower filter media retainer plates 34, 36 may be coupled together using a tongue-and-groove system or a snap-fit arrangement to securably mount upper filter media retainer plate 34 on top of lower filter media retainer plate 36. Such a connection desirably provides a mechanical seal that prevents passage of filter media 18 between upper filter media retainer plate 34 and lower filter media retainer plate 36.

Figure 4:
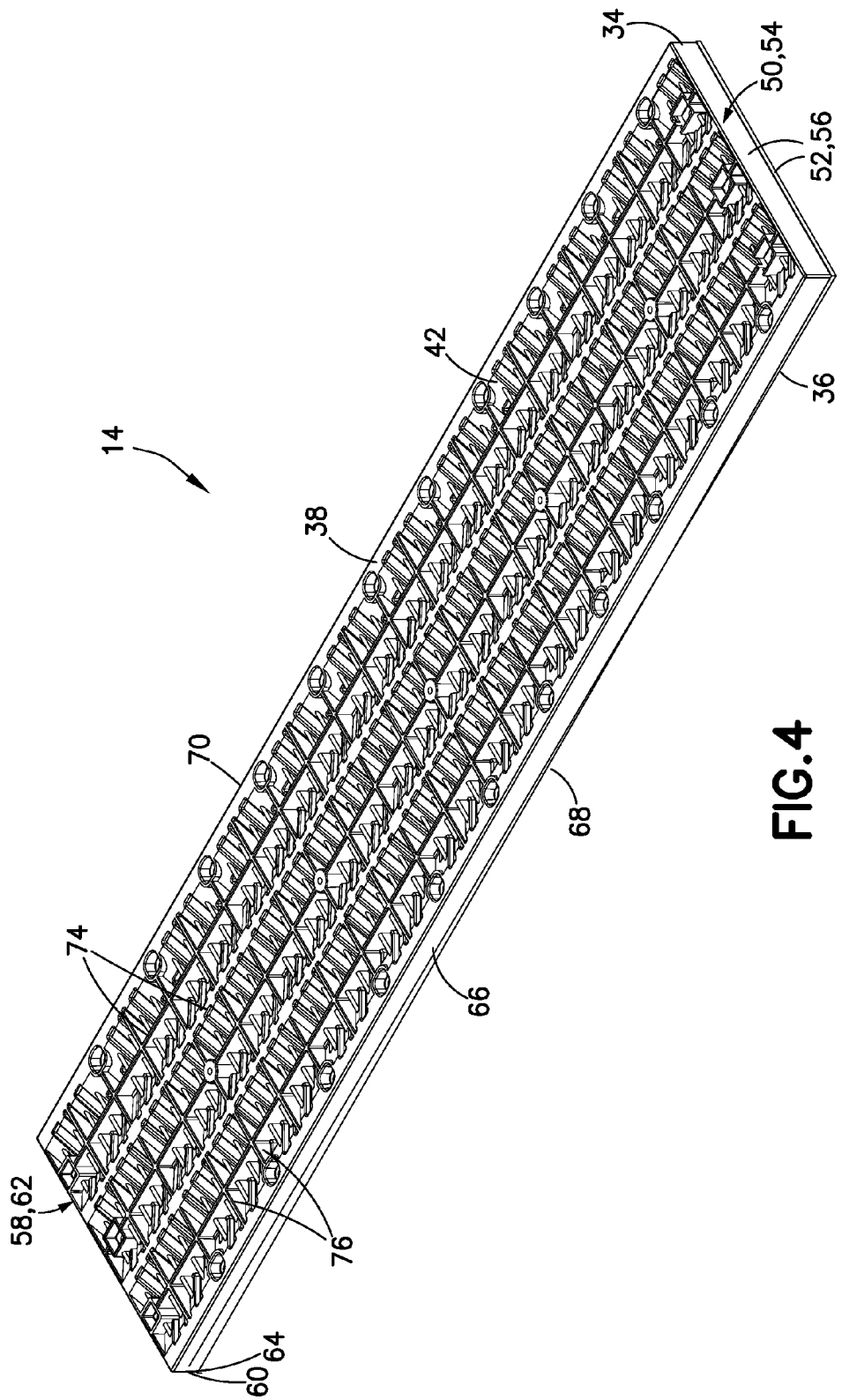
FIG. 4 is a top perspective view of a filter media retainer assembly in accordance with an exemplary embodiment of the present disclosure.
Figure 5:
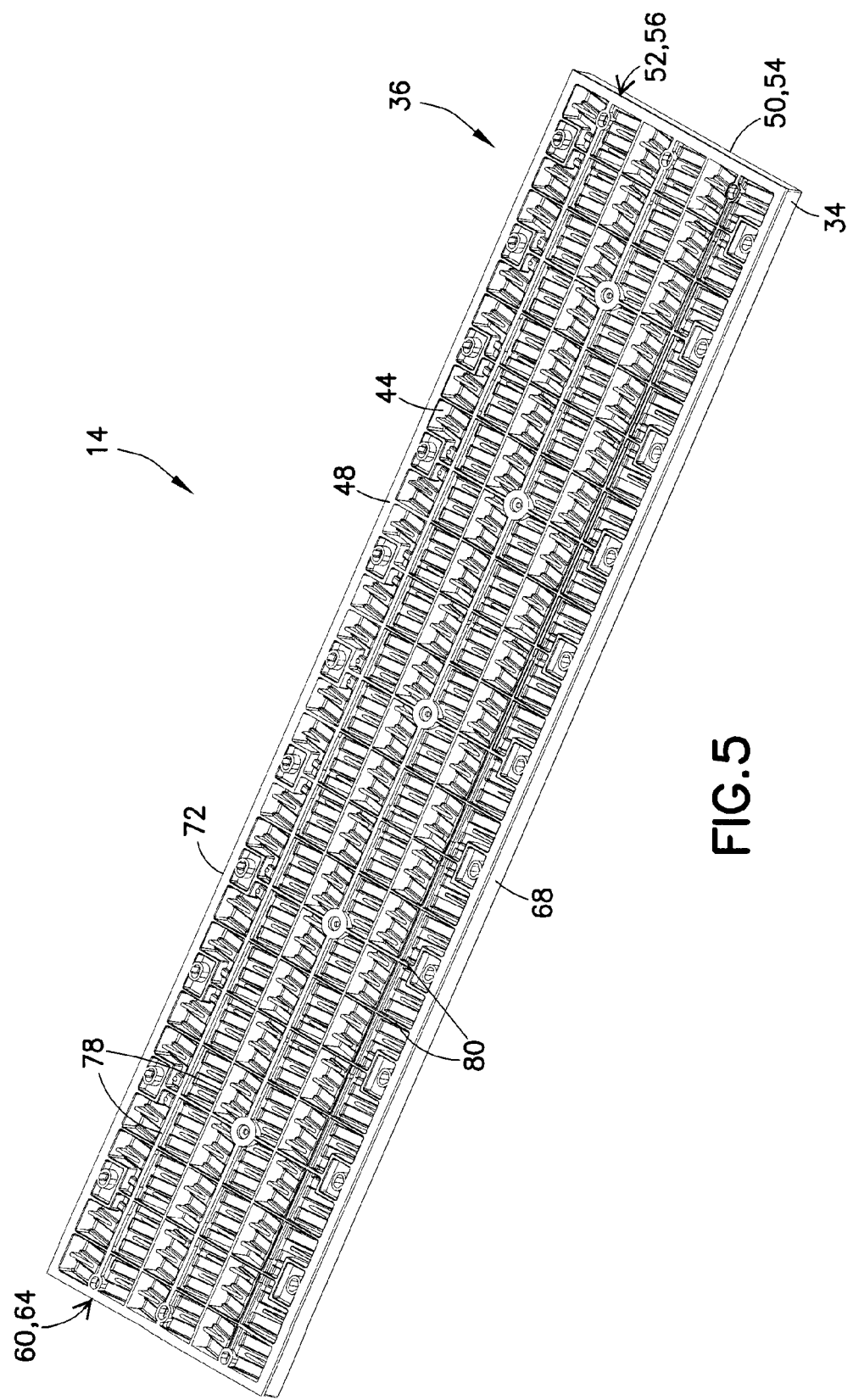
FIG. 5 is a bottom perspective view of the filter media retainer assembly of FIG. 4.

With continuing reference to FIGS. 4 and 5, upper filter media retainer plate 34 and lower filter media retainer plate 36 are joined together to form a single filter media retainer assembly 14 by fitting upper filter media retainer plate 34 on top of the corresponding lower filter media retainer plate 36, such that the plurality of hopper-shaped cavities 42 provided on upper filter media retainer plate 34 are in alignment with the plurality of hopper-shaped cavities 44 provided on lower filter media retainer plate 36. The respective plurality of hopper-shaped cavities 42, 44 on upper and lower filter media retainer plates 34, 36 are aligned in an assembled media retainer assembly 14 such that a slight gap is defined between the cavities to define a plurality of passages. Once upper filter media retainer plate 34 and lower filter media retainer plate 36 are in such a position, fasteners 16 may be positioned through aligned mounting apertures 86, 88 to secure and connect upper filter media retainer plate 34 and lower filter media retainer plate 36 together. In other embodiments, upper filter media retainer plate 34 and lower filter media retainer plate 36 may be joined together by other mechanical methods, such as an interference fit or by a chemical adhesive, such as glue or epoxy.

Referring to FIGS. 6A-6B and 7A-7B, longitudinal ribs 74, 78 and transverse ribs 76, 80 intersect to form a grid including a plurality of hopper-shaped cavities 42, 44 defined between the ribs. Each hopper-shaped cavity 42, 44 generally includes a first wall 90, 92 and a second wall 94, 96 extending substantially perpendicular the longitudinal ribs 74, 78. First and second walls 90, 92, 94, and 96 may be sloped inwardly toward each other. In one embodiment, first wall 90 of upper filter media retainer plate 34 and first wall 92 of lower filter media retainer plate 36 have a slope greater than 0 degrees and less than 90 degrees. Similarly, second wall 94 of upper filter media retainer plate 34 and second wall 96 of lower filter media retainer plate 36 have a slope greater than 0° and less than 90°. In some embodiments, the slope of first walls 90, 92 may be different than the slope of second sloped walls 94, 96.

Each hopper-shaped cavity 42, 44 also includes opposing vertical walls 98, 100 extending inwardly from the transverse ribs 76, 80. First walls 90, 92, second walls 94, 96 and opposing vertical walls 98, 100 together define hopper-shaped cavities 42, 44 of upper and lower filter media retainer plates 34, 36, respectively. First walls 90, 92, second walls 94, 96 and opposing vertical walls 98, 100 are connected at a base portion 102, 104 to form a hopper-shaped structure shown in FIGS. 5-8. With continuing reference to FIGS. 6A-6B and 7A-7B, base portion 102, 104 of upper and lower filter media retainer plates 34, 36 is disposed between first wall 90, 92 and second wall 94, 96. One or more support ribs 112 may be provided between first wall 90, 92 and second wall 94, 96 of upper and lower filter media retainer plates 34, 36.

Referring to FIGS. 6A-6B, one or more first slots 106 are formed on upper filter media retainer plate 34. First slots 106 extend between first wall 90 and second wall 94 in a direction substantially parallel with first wall 90 and second wall 94. Alternatively stated, first slots 106 extend between first wall 90 and second wall 94 in a direction that is substantially parallel to transverse ribs 76 and substantially perpendicular to longitudinal ribs 76. First slots 106 extend through upper filter media retainer plate 34 from top surface 38 to bottom surface 46.

Referring to FIGS. 7A and 7B, one or more second slots 108 are formed on lower filter media retainer plate 36. Second slots 108 extend between first wall 92 and second wall 96 in a direction substantially parallel with first wall 92 and second wall 96. Alternatively stated, second slots 108 extend between first wall 92 and second wall 96 in a direction that is substantially parallel to transverse ribs 80 and substantially perpendicular to longitudinal ribs 78. Second slots 108 extend through lower filter media retainer plate 36 from top surface 40 to bottom surface 46. First slots 106 of upper filter media retainer plate 34 are longitudinally offset from second slots 108 of lower filter media retainer plate 36 such that when upper and lower filter media retainer plates 34, 36 are coupled together, first and second walls 90, 94 of upper filter media retainer plate 34 are received within second slots 108 of lower filter media retainer plate 36. Similarly, first slots 106 of upper filter media retainer plate 34 receive first and second walls 92, 96 of lower filter media retainer plate 36 when upper and lower filter media retainer plates 34, 36 are coupled together. Accordingly, adjacent edges of the first and second walls 92, 96 define passages sized to allow for the passage of the liquid and to prevent the passage of the filter media.

Referring back to FIG. 1, a plurality of channels 110 is formed for allowing fluid to pass through filter media retainer assembly 14. In one embodiment, channels 110 are sized to permit the passage of liquid to and from top surface 38 of upper filter media retainer plate 34 and bottom surface 48 of lower filter media retainer plate 36. Each of the plurality of channels 110 desirably have a width that is smaller than the diameter of the smallest filter media particle such that filter media particles cannot pass through the channels. When assembled, at least a part of upper filter media retainer plate 34 is relatively flexible with respect to at least a part of lower filter media retainer plate 36. In one embodiment, upper and lower filter media plates 34, 36 are relatively moveable during a backwash procedure to dislodge any filter media particles or biology that may be lodged in channels 110.

Each hopper-shaped cavity 42 on upper filter media retainer plate 34 acts as a chamber for containing and retaining the filter media particles. The plurality of channels 110 within each hopper-shaped cavity 42 has a sufficient width so as to prevent the filter media particles from passing through filter media retainer assembly 14, while not creating any significant head loss in filter system 10 during filtering and backwashing operations. This desirably enables for a desired flow velocity during backwashing and minimizing biology and filter media particles from clogging channels 110 due to biological and chemical scaling.

With reference to FIG. 8, in another embodiment of filter media retainer assembly 14, a backwash channel 120 is formed around at least a portion of the periphery of upper filter media retainer plate 34 and lower filter media retainer plate 36. For example, backwash channel 120 may extend between filter media retainer plate 34 and lower filter media retainer plate 36 along one or more of first end walls 54, 56, second end walls 62, 64, first sidewall 66, 68, and second sidewall 70, 72. In one embodiment, backwash channel 120 extends around the entire perimeter of filter media retainer assembly.

With continuing reference to FIG. 8, backwash channel 120 is formed as a space between an exterior portion of at least one of the sidewalls of lower filter media retainer plate 36 and an interior portion of upper filter media retainer plate 34. During a backwash procedure, backwash fluid, such as water or air, is directed through filter media retainer assembly 14 to dislodge any filter media or biological buildup formed on filter media retainer assembly. Backwash fluid is also directed through backwash channel 120 to clean the entire periphery of filter media retainer assembly 14. As the backwash fluid is passed through the backwash channel 120, any filter media or biological buildup formed along the perimeter of an area where upper and lower filter media retainer plates are joined is cleaned.

Figure 9A:
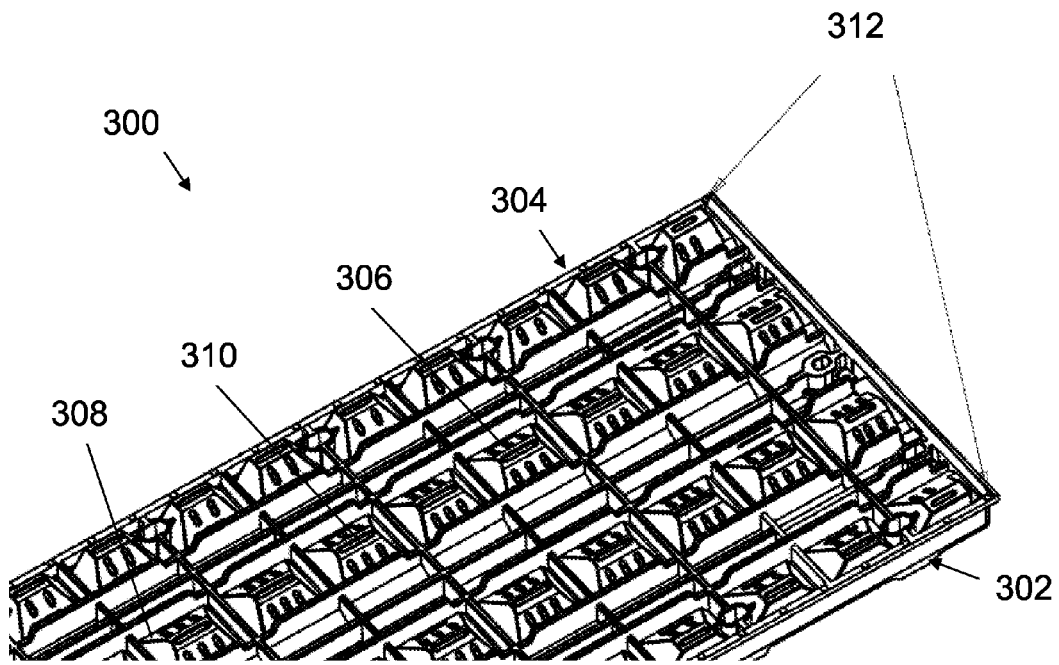
FIG. 9A is a detailed, bottom perspective view of a further embodiment of a filter media retainer plate having a perimeter wash feature.
Figure 9B:
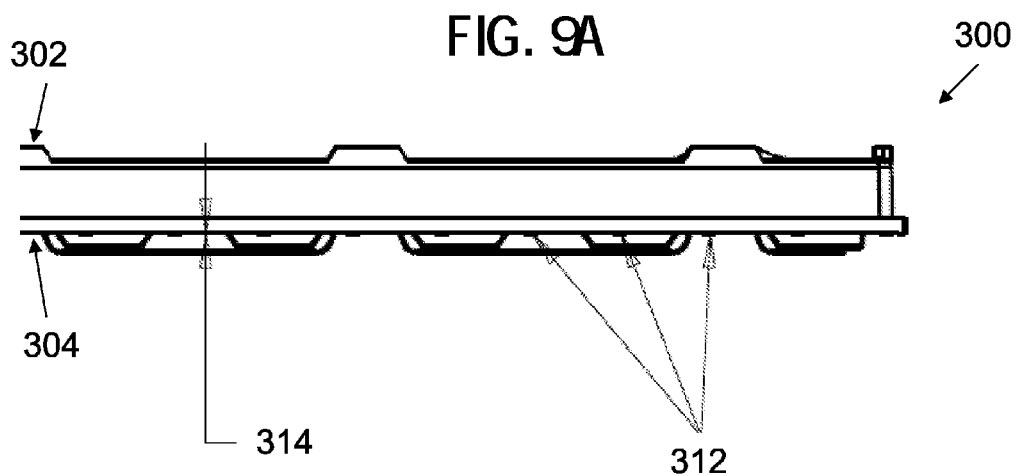
FIG. 9B is a detailed side view of the filter media retainer plate shown in FIG. 9A.
Figure 10A:
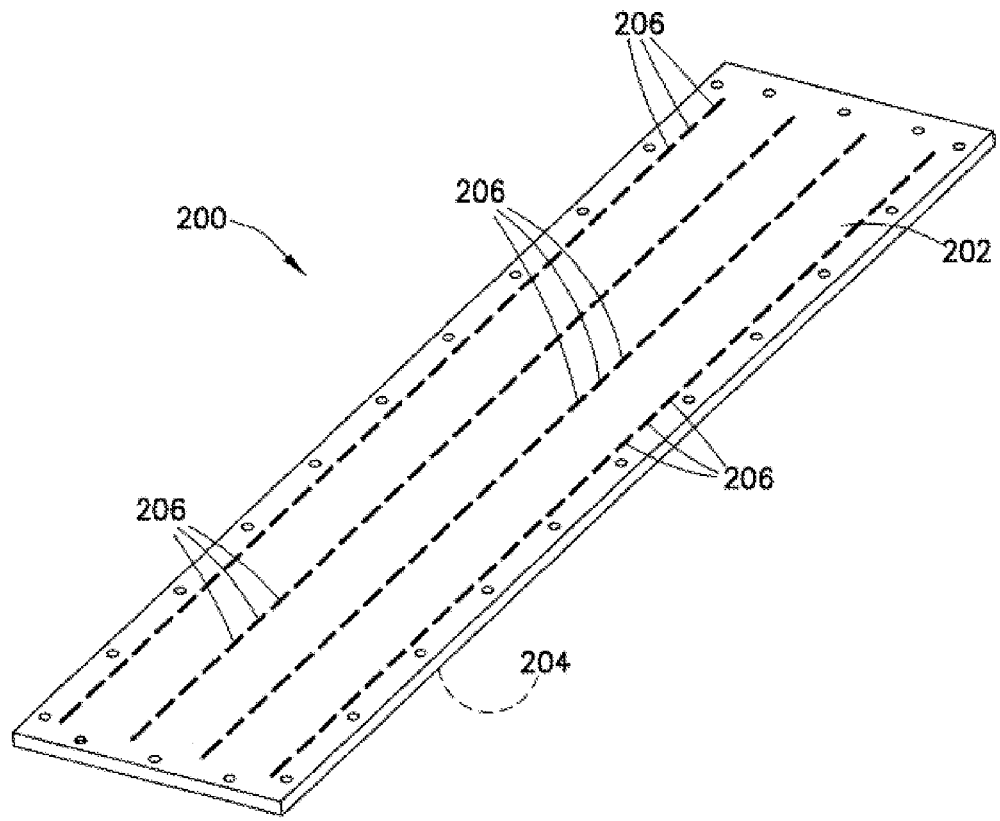
FIG. 10A is a perspective view of a prior art flat media retainer plate.
Figure 10B:
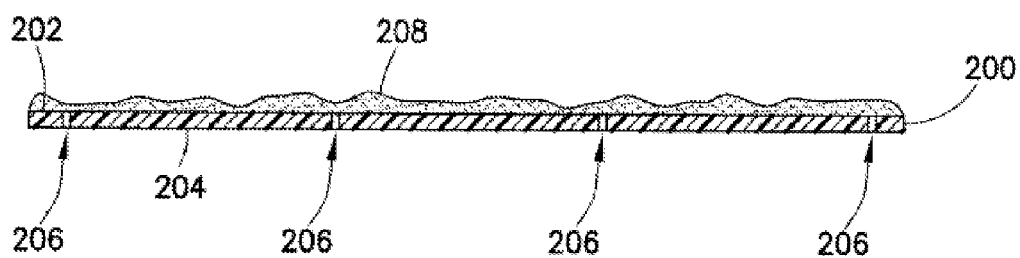
FIG. 10B is a transverse cross-sectional view of the prior art flat media retainer plate of FIG. 10A.

With reference to FIGS. 9A and 9B, another embodiment of a filter media retainer plate 300 is shown. In this embodiment, filter media retainer plate 300 includes a single plate, i.e., only one filter media retainer plate is connected to an underdrain assembly (not shown in FIGS. 9A and 9B). No additional plates located above or below the filter media retainer plate 300 are included. The filter media retainer plate 300 includes a top surface 302, a bottom surface 304, and defines at least one hopper-shaped compartment 306 having at least one sloped wall 308 defining at least one slot 310 spanning the top and bottom surfaces. The filter media retainer plate 300 also includes a plurality of projections 312 formed along the periphery of the bottom surface 304 of the filter media retainer plate 300. The plurality of projections 312 may be equally spaced around the perimeter of the filter media retainer plate 300. Alternatively, the projections may be formed on the top surface of the underdrain around the interface between the filter media retainer plate 300 and the underdrain. The projections 312 offset the bottom surface 304 of the filter media retainer plate 300 from the top surface of the underdrain assembly to create a backwash channel 314 may be sized to be smaller than the diameter of filter embodiment, the backwash channel 314 may be sized to be smaller than the diameter of filter media to allow the passage of the backwashing fluid and prevent the passage of filter media. The backwash channel 314 allows the perimeter of the filter media retainer plate 300 to be cleaned during a backwash procedure to remove any buildup or scaling.

During a filtering operation, a liquid which contains undesirable particles to be filtered enters each hopper-shaped cavity 42 of upper filter media retainer plate 34. Next, liquid containing particles flows in a generally downward direction through the plurality of channels 110 to pass through the filter media retainer assembly 14 to underdrain block 12. During this process, filter media particles remove the undesirable particles contained in the liquid, such as dirt, debris, chemical and biological contaminants, and the filtered liquid travels through the plurality of channels 110 and into underdrain block 12.

During a backwash operation, backwash fluid, such as a liquid or air, flows from underdrain block 12 in a generally upward direction through dispersion apertures to pass through the filter media retainer assembly 14. During such a backwash operation, first and second walls of upper filter media retainer plate 34 can flex relative to first and second walls of lower filter media retainer plate 36 such that channels 110 expand and contract to dislodge any materials that may be lodged therein. In some embodiments, the walls of channels 110 may be relatively inclined to create a V-shaped channel that narrows in a vertical direction going from upper filter media retainer plate 34 toward lower filter media retainer plate 36.

In the described embodiments, media retainer assembly 14 includes one plate section having one upper and one lower filter media retainer plate 34, 36. In an alternative embodiment, filter media retainer assembly 14 may include more than one plate section. In such alternative embodiment, a plurality of upper and lower filter media retainer plates 34, 36 may be stacked vertically to form media retainer assembly 14. In other alternative embodiments, filter media retainer plate of media retainer assembly 14 may include more than two plate pairs stacked above upper filter media retainer plate 34 or below lower filter media retainer plate 36. In all embodiments of filter media retainer assembly 14, including embodiments having more than one set of upper and lower filter media retainer plates 34, 36, media retainer assembly 14 includes the same number of upper filter media retainer plates 34 as the number of lower filter media retainer plates 36, i.e., media retailer assembly 14 includes upper and lower filter media retainer plates 34, 36 in pairs connected to underdrain assembly 12.

While various embodiments of the media retainer assembly were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A filter system for filtering particles from a liquid containing the particles, the filter system comprising:
   an underdrain assembly having an underdrain wall defining at least one underdrain chamber;
   a media retainer assembly, the media retainer assembly including an upper filter media retainer plate defining a plurality of hopper-shaped cavities that face in an upward direction, and a lower filter media retainer plate defining a plurality of hopper-shaped cavities that face in a downward direction,
   wherein the plurality of hopper-shaped cavities on the upper filter media retainer plate are vertically aligned with the plurality of hopper-shaped cavities on the lower filter media retainer plate, wherein the cavities of the upper retainer plate have a pair of first walls defining a first slot therebetween, wherein the cavities of the lower retainer plate have a pair of first walls defining a second slot therebetween, and wherein the first slots of the upper retainer plate are offset from the second slots in the lower retainer plate so that the first walls of the upper retainer plate are received within the respective second slots of the lower retainer plate and so that first walls of the lower retainer plate are received within the first slots of the upper retainer plate to define a plurality of first passages between adjacent edges of the first walls of the upper and lower retainer plates, wherein each of the first passages is sized to allow for the passage of the liquid and to prevent the passage of a filter media, and wherein the upper filter media retainer plate is relatively flexible in relation movable relative to the lower filter media retainer plate; and
   wherein the filter media has a plurality of filter media particles disposed on the upper filter media retainer plate, the filter media adapted to capture the particles from the liquid as the liquid passes through the plurality of passages to the underdrain chamber.

2. The filter system according to claim 1, wherein the cavities of the upper retainer wall have a pair of second walls opposite the pair of first walls of the upper retainer plate defining a third slot therebetween, wherein the cavities of the lower retainer plate have a pair of second walls opposite the pair of first walls of the lower retainer plate defining a fourth slot therebetween, and wherein the third slots of the upper retainer plate are offset from the fourth slots in the lower retainer plate so that the second walls of the upper retainer plate are received within the respective fourth slots of the lower retainer plate and so that the second walls of the lower retainer plate are received within the third slots of the upper retainer plate to define a plurality of second passages between adjacent edges of the second walls of the upper and lower retainer plates, wherein each of the second passages is sized to allow for the passage of the liquid and to prevent the passage of a filter media, and wherein the upper filter media retainer plate is relatively flexible in relation movable relative to the lower filter media retainer plate.

3. The filter system according to claim 2, wherein the first and second passages are adapted to direct the flow of the fluid in a vertical direction through the media retainer assembly to the underdrain assembly, and prevent the passage of the filter media larger than the plurality of passages beyond the first slots and the second slots.

4. The filter system according to claim 2, wherein the first slots, the second slots, the third slots, and the fourth slots extend in a direction perpendicular to a longitudinal direction of the respective upper and lower filter media retainer plates.

5. The filter system according to claim 2, wherein at least one support rib extends between the first wall and the second wall across the hopper-shaped cavities of the upper and lower filter media retainer plates.

6. The filter system according to claim 2, wherein one of the first wall and the second wall of each of the upper and lower filter media retainer plates is sloped relative to vertical planes of the upper and lower filter media retainer plates.

7. The filter system according to claim 6, wherein a slope of one of the first wall and the second wall of the upper filter media retainer plate is greater than 0 degrees but less than 90 degrees with respect to the vertical plane of the upper filter media retainer plate.

8. The filter system according to claim 6, wherein a slope of one of the first wall and the second wall of lower filter media retainer plate is greater than 0 degrees but less than 90 degrees with respect to the vertical plane of the lower filter media retainer plate.

9. The filter system according to claim 1, wherein the underdrain assembly includes a plurality of channels for providing fluid communication between the media retainer assembly and the at least one underdrain chamber.

10. The filter system according to claim 1, further comprising one or more backwash channels provided along at least a portion of an outside perimeter between upper and lower filter media retainer plates.

11. A media retainer assembly for filtering particles from a liquid containing the particles, the media retainer assembly comprising:
an upper filter media retainer plate defining a plurality of hopper-shaped cavities that face in an upward direction, and a lower filter media retainer plate defining a plurality of hopper-shaped cavities that face in a downward direction,
wherein the plurality of hopper-shaped cavities on the upper filter media retainer plate are vertically aligned with the plurality of hopper-shaped cavities on the lower filter media retainer plate, wherein the cavities of the upper retainer plate have a pair of first walls defining a first slot therebetween, wherein the cavities of the lower retainer plate have a pair of first walls defining a second slot therebetween, and wherein the first slots of the upper retainer plate are offset from the second slots in the lower retainer plate so that the first walls of the upper retainer plate are received within the respective second slots of the lower retainer plate and so that first walls of the lower retainer plate are received within the first slots of the upper retainer plate to define a plurality of first passages between adjacent edges of the first walls of the upper and lower retainer plates, wherein each of the first passages is sized to allow for the passage of the liquid and to prevent the passage of a filter media, and wherein the upper filter media retainer plate is movable relative to the lower filter media retainer plate.

12. The filter system according to claim 11, wherein the cavities of the upper retainer wall have a pair of second walls opposite the pair of first walls of the upper retainer plate defining a third slot therebetween, wherein the cavities of the lower retainer plate have a pair of second walls opposite the pair of first walls of the lower retainer plate defining a fourth slot therebetween, and wherein the third slots of the upper retainer plate are offset from the fourth slots in the lower retainer plate so that the second walls of the upper retainer plate are received within the respective fourth slots of the lower retainer plate and so that the second walls of the lower retainer plate are received within the third slots of the upper retainer plate to define a plurality of second passages between adjacent edges of the second walls of the upper and lower retainer plates, wherein each of the second passages is sized to allow for the passage of the liquid and to prevent the passage of a filter media, and wherein the upper filter media retainer plate is relatively flexible in relation movable relative to the lower filter media retainer plate.

13. The filter system according to claim 12, wherein the first and second passages are adapted to direct the flow of the fluid in a vertical direction through the media retainer assembly to the underdrain assembly, and prevent the passage of the filter media larger than the plurality of passages beyond the first slots and the second slots.

14. The filter system according to claim 12, wherein the first slots, the second slots, the third slots, and the fourth slots extend in a direction perpendicular to a longitudinal direction of the respective upper and lower filter media retainer plates.

15. The media retainer assembly according to claim 12, wherein at least one support rib extends between the first wall and the second wall across the hopper-shaped cavities of the upper and lower filter media retainer plates.

16. The filter system according to claim 12, wherein one of the first wall and the second wall of each of the upper and lower filter media retainer plates is sloped relative to vertical planes of the upper and lower filter media retainer plates.

* * * * *

UNITED STATES PATENT AND TRADEMARK OFFICE
CERTIFICATE OF CORRECTION

| | | |
|---|---|---|
| PATENT NO. | : 9,138,665 B2 | Page 1 of 1 |
| APPLICATION NO. | : 13/553897 | |
| DATED | : September 22, 2015 | |
| INVENTOR(S) | : Christopher J. Ball et al. | |

It is certified that error appears in the above-identified patent and that said Letters Patent is hereby corrected as shown below:

On the title page

Column 1, Item (75) Inventors, Line 3, delete "Canberry Township," and insert
-- Cranberry Township, --

In the claims

Column 10, Lines 46-47, Claim 1, after "retainer plate is" delete "relatively flexible in relation"

Column 12, Line 17, Claim 12, delete "filter system" and insert -- media retainer assembly --

Column 12, Line 35, Claim 13, delete "filter system" and insert -- media retainer assembly --

Column 12, Line 41, Claim 14, delete "filter system" and insert -- media retainer assembly --

Column 12, Line 49, Claim 16, delete "filter system" and insert -- media retainer assembly --

Signed and Sealed this
Twenty-third Day of February, 2016

Michelle K. Lee
*Director of the United States Patent and Trademark Office*